3,307,402
COMPENSATED TAPPED THERMOCOUPLE SYSTEM
Donald V. Richardson, Stratford, Conn., assignor to United Aircraft Corporation, East Hartford, Conn., a corporation of Delaware
Filed Dec. 4, 1963, Ser. No. 327,898
2 Claims. (Cl. 73—361)

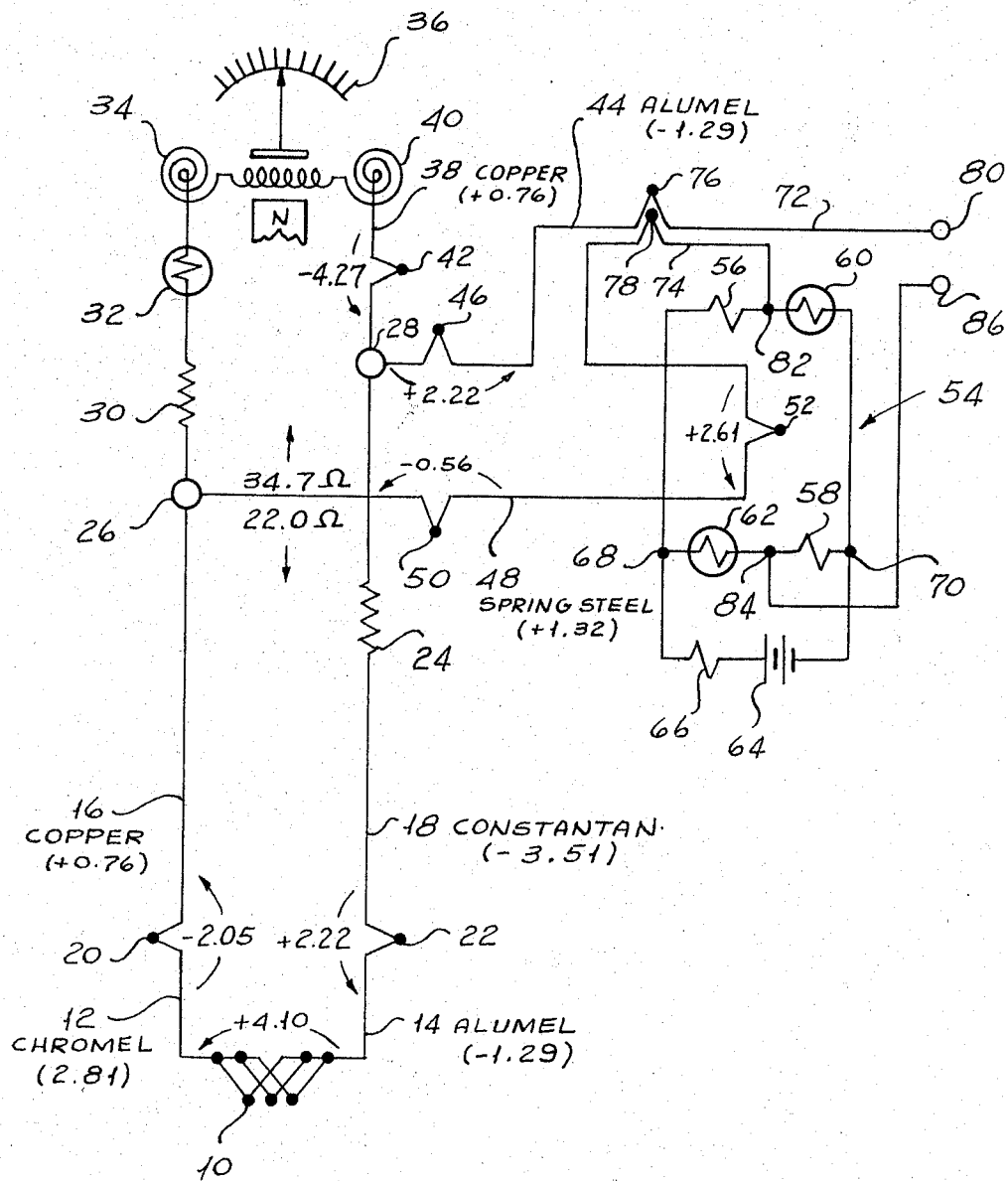

My invention relates to a compensated tapped thermocouple system and more particularly to a system for producing an electrical signal representative of hot junction temperature without disturbing a previously existing installation.

Thermocouple systems are well known in the prior art for producing an indication of temperature. In most thermocouple measuring systems of the prior art, the cold junction of the system is maintained at a constant temperature so that a signal can be obtained which directly provides a measure of the temperature at the hot junction.

One particular application of a thermocouple system is in modern aircraft using gas turbine engines where the system is employed to provide an accurate measurement of the exhaust gas temperature. In such an installation, however, it is not feasible to maintain the cold junction at a constant temperature. It is permitted to follow the temperature of its environment. Owing to this fact, such installations must be compensated for the effect of variations in cold junction temperatures. To achieve this result in systems of the prior art, thermocouple leads with controlled resistance are used and a special form of D'Arsonval meter movement forms the indicator. The meter embodies temperature-sensitive springs, such as bimetallic hairsprings, to control the meter movement in such a way as compensates for the effect of variation in cold junction temperature.

Other systems, such as automatic control or recording systems used on modern aircraft require as an input an electrical signal which is an accurate representation of the exhaust gas temperature as measured by the hot junction.

In the system of the prior art discussed hereinabove for indicating exhaust gas temperature, all that is available without making internal connections to the system are the indicator terminals. The voltage available at these terminals, however, is not suitable as an input to the control or recording system since it is to a great extent dependent upon cold junction temperature and thus is not an accurate measure of hot junction temperature. No satisfactory solution has been proposed in the prior art for producing an electrical signal which is an accurate indication of hot junction temperature without either redesigning the existing system or making connections into the system itself.

I have invented a compensated tapped thermocouple system for producing an electrical signal which is an accurate indication of hot junction temperature. My system achieves this result without disturbing the existing installation. It requires only connections to the available terminals. It is simple and inexpensive for the result achieved thereby.

One object of my invention is to provide a compensated tapped thermocouple system for providing an electrical signal which is an accurate indication of hot junction temperature.

Another object of my invention is to provide a compensated tapped thermocouple system which is compatible with already existing installations.

A further object of my invention is to provide a compensated tapped thermocouple system which does not require internal connections to the already existing system.

A still further object of my invention is to provide a compensated tapped thermocouple system which is simple and inexpensive for the result achieved thereby.

Other and further objects of my invention will appear from the following description.

In general, my invention contemplates the provision of a compensated tapped thermocouple system in which I connect external thermocouples to the indicator terminals to generate a voltage which bucks the cold junction voltage of the system. I then compensate the junction produced by the interconnection of the bucking voltage thermocouples to permit me to read an output voltage which is an accurate indication of the hot junction voltage.

In the accompanying drawing which forms part of the instant specification and which is to be read in conjunction therewith, the figure is a schematic view of my compensated tapped thermocouple system.

Referring now to the figure, one form of the existing thermocouple system for measuring exhaust gas temperatures includes a plurality of chromel and alumel junctions 10 located at the exhaust gas outlet so as to be elevated to the temperature of the exhaust gas. Respective Chromel and Alumel leads 12 and 14 connect the hot junctions 10 to a copper lead wire 16 and to a constantan lead wire 18 to form a Chromel-copper junction 20 and an Alumel constantan junction 22. The constantan lead 18 comprises an adjusting resistance 24 having a value such as determines the total external resistance in a manner to be described. Leads 16 and 18 extend respectively to a copper indicator terminal 26 and to a constantan indicator terminal 28. A calibrating resistance 30 and a negative temperature coefficient resistance 32 connect the terminal 26 to one of the bimetallic hairsprings 34 of the meter movement indicated generally by the reference character 36. The copper lead 38 connects the constantan terminal 28 to the other meter spring 40 to form a constantan-copper junction 42.

In order to explain the characteristics of my system, there are given in Table I below the thermoelectric properties of the various materials employed in the thermocouple system.

Table I

| Material: | Mv./100° C. over C.J. |
|---|---|
| Chromel | 2.81 |
| Iron | 1.89 |
| Spring steel | 1.32 |
| 80% nickel chrome | 1.14 |
| Tungsten | 1.12 |
| Copper or zinc | 0.76 |
| Manganin | 0.61 |
| 18–8 stainless steel | 0.44 |
| Platinum | 0.00 |
| Alumel | −1.29 |
| 99% nickel alloy | −1.50 |
| Constantan | −3.51 |

From the characteristics set forth in the table, it can be seen that each of the junctions 10, 20, 22 and 42 has a certain characteristic. For purposes of exposition, I have indicated the numerical values of these characteristics adjacent the junction in the figure with the signs given for a clockwise direction around the circuit. It will readily be appreciated that in operation of the thermocouple system, a voltage exists across the terminals 26 and 28. In one particular system of the prior art, the input resistance value to the indicator is set at 34.7 ohms by means of the calibrating resistor 30. The resistance of the external circuit is set by means of resistor 24 to have a total value of 22.0 ohms. The total voltage in the circuit is the difference between the hot junction voltage and the cold junction voltage and may be represented as (1) $$e = e_{hj} - e_{cj}$$

The current flow in the circuit then is (2) $$I = \frac{e_{hj} - e_{cj}}{R_1 + R_m}$$

where $R_1$ is the external circuit resistance and $R_m$ is the input resistance to the indicator. The indicator terminal voltage $e_t$ between terminals 26 and 28 will be (3) $$e_t = e_{hj} - IR_1 = e_{hj} - \left(\frac{e_{hj} - e_{cj}}{R_1 + R_m}\right)$$

or (4) $$e_t = \frac{R_m e_{hj} + R_1 e_{cj}}{R_1 + R_m}$$

Using the values given above for the meter resistance and for the external circuit resistance, it can be seen that (5) $$e_m = \frac{34.7 e_{hj} + 22 e_{cj}}{5.67} = 0.612 e_{hj} + 0.388 e_{cj}$$

From Equation 5, it will readily be seen that the terminal voltage is in a relatively large measure dependent upon the temperature of the cold junction. Since it is desired to derive an electrical signal which is a measure of hot junction temperature, if the terminal voltage is used the error will be so large that no accurate indication of hot junction temperature will be obtained.

It will further be seen from the figure that the voltage between the terminals 26 and 28 has a characteristic of −4.27mv./100° C. The error included in this characteristic, owing to the cold junction, is −4.27×0.388=−1.66. In my system for obtaining a voltage which is an accurate measure of hot junction temperature, I generate a voltage which bucks the effect of the cold junction voltage to permit me to read the voltage which is an accurate indication of hot junction temperature. I connect an Alumel lead 44 to the constantan terminal 28 to form a constantan-Alumel junction 46. I connect a spring steel lead 48 to the copper terminal 26 to form a copper-spring steel junction 50. From Table I above, it can readily be seen that the junction 46 will have a characteristic of +2.22 mv./100° C. while the junction 50 has a characteristic of −0.56 mv./100° C. Thus the two junctions 46 and 50 produce an over-all characteristic of +1.66 which counteracts the effect of the cold junction 42.

Since I have counterbalanced the effect of the cold junction 42, there is now available a voltage which is an accurate measure of the temperature of the hot junction. However, in order to read this voltage it is necessary to connect the conductors 44 and 48 to produce another junction 52 which is an Alumel spring steel junction. I compensate the junction 52 electrically so that variations in temperature at this junction will not affect the reading I obtain. I achieve the electrical compensation by means of a bridge indicated generally by the reference character 54 having a pair of resistance arms 56 and 58 and a pair of negative temperature coefficient resistance arms 60 and 62. I connect a battery 64 and a current-limiting resistor 66 to the input terminals 68 and 70 of the bridge. In order to avoid the necessity of using Alumel wire throughout the system, I connect copper leads 72 and 74 into the lead 44 to produce a pair of alumel-copper junctions 76 and 78. Since these two junctions are maintained at the same temperature, they produce no over-all effect on the system. The copper lead 72 is connected to one output terminal 80 of my system while the lead 74 is connected to one of the bridge output terminals 82. I connect the other bridge output terminal 84 to the other output termnial 86 of my system. When the temperature of the junction 52 changes, the resistance values of the negative temperature coefficient resistors 60 and 62 change in such a direction as to produce an output voltage at terminals 82 and 84 which compensates for the effect of the temperature change on the junction 52.

In operation of my compensated tapped thermocouple system, with the junctions 10 located at the point at which the measurement of temperature is to be made as, for example, at the exhaust gas outlet, the indicator 36 produces an accurate indication of this temperature in a manner known to the art. The bimetallic hairsprings 34 and 40 compensate for the effect of temperature change in the cold junction 42. However, the voltage at the terminals 26 and 28 includes an error resulting from variations in temperature on the cold junction 42. My two junctions 46 and 50, which are at substantially the same temperature as is the cold junction 42, produce a voltage which counterbalances the effect of the cold junction 42 on the voltage available at terminals 26 and 28. Thus, there is available a voltage which is an accurate measure of the hot junction voltage at junctions 10.

In order to read the hot junction voltage of necessity I must connect the conductors 44 and 48, thus producing the junction 52. Now in order that a change in temperature at junction 52 will not have an adverse effect on the voltage being read, I employ the bridge circut 54 to compensate for the effect of any temperature change at the junction 52. That is, when the temperature at junction 52 changes, the values of the resistors 60 and 62 change in such a way as to produce a voltage which compensates for the effect of the temperature change. Thus, I have available at terminals 80 and 86 an output voltage which is an accurate indication of the temperature of the hot junction. This voltage may be fed into any recording system or control system which requires as an input a signal which is an accurate measure of hot junction temperature.

It will be seen that I have accomplished the objects of my invention. I have provided a system for obtaining a signal which is an accurate measure of hot junction temperature and which is adaptable to existing installations. My system does not require any internal connections to an existing system. It is relatively simple for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A thermocouple system including in combination, a hot junction generating a voltage representing a temperature to be measured, a cold junction generating a voltage, a meter having terminals connecting said meter in a circuit with said junctions, said meter comprising a movement for indicating said temperature and internal means for compensating for the effect of temperature on said cold junction, an output circuit also connected to said terminals, an external auxiliary thermocouple system in said ouptut circuit comprising first auxiliary thermocouple means for generating a voltage for bucking the effect due to temperature variations of said cold junction voltage at said terminals, second thermocouple means connected to said first thermocouple means and including means for compensating said second thermocouple means for changes in temperature for providing an output voltage in said output circuit representing said temperature to be measured without affecting said meter.

2. A system as in claim 1 in which said second thermocouple compensating means comprises a temperature responsive bridge.

References Cited by the Examiner

UNITED STATES PATENTS 2,871,701  2/1959  Knudsen _____ 73—361

FOREIGN PATENTS 7,597  4/1915  Great Britain.

LOUIS R. PRINCE, *Primary Examiner.*

S. H. BAZERMAN, *Assistant Examiner.*